US009755252B2

(12) United States Patent
Kondou (10) Patent No.: US 9,755,252 B2
(45) Date of Patent: Sep. 5, 2017

(54) FUEL CELL

(71) Applicant: TOYOTA JIDOSHA KABUSHIKI KAISHA, Toyota-shi, Aichi-ken (JP)

(72) Inventor: Takashi Kondou, Nagoya (JP)

(73) Assignee: Toyota Jidosha Kabushiki Kaisha, Toyota-shi, Aichi-ken (JP)

( * ) Notice: Subject to any disclaimer, the term of this patent is extended or adjusted under 35 U.S.C. 154(b) by 25 days.

(21) Appl. No.: 14/859,904

(22) Filed: Sep. 21, 2015

(65) Prior Publication Data

US 2016/0093902 A1 Mar. 31, 2016

(30) Foreign Application Priority Data

Sep. 25, 2014 (JP) ................................. 2014-194931

(51) Int. Cl.

| H01M 8/02 | (2016.01) |
|---|---|
| H01M 8/0276 | (2016.01) |
| H01M 8/0228 | (2016.01) |
| H01M 8/0273 | (2016.01) |
| H01M 8/0286 | (2016.01) |
| H01M 8/1018 | (2016.01) |

(52) U.S. Cl.
CPC ....... H01M 8/0276 (2013.01); H01M 8/0228 (2013.01); H01M 8/0273 (2013.01); H01M 8/0286 (2013.01); H01M 2008/1095 (2013.01)

(58) Field of Classification Search
CPC ............. H01M 8/0228; H01M 8/0273; H01M 8/0276; H01M 2008/1095; H01M 8/0286
See application file for complete search history.

(56) References Cited

U.S. PATENT DOCUMENTS

| 2008/0206617 A1* | 8/2008 | Okada ................. H01M 8/0206 429/413 |
| 2012/0104729 A1* | 5/2012 | Yi ............................ B62B 7/08 280/642 |
| 2013/0260281 A1 | 10/2013 | Sato |
| 2015/0104729 A1* | 4/2015 | Ishida ................. H01M 8/0202 429/483 |

FOREIGN PATENT DOCUMENTS

| JP | 2009-218190 | 9/2009 |
| JP | 2009-277539 | 11/2009 |
| JP | 2011-34768 | 2/2011 |
| JP | 2012-123949 | 6/2012 |

* cited by examiner

*Primary Examiner* — Stewart Fraser
*Assistant Examiner* — Monique Wills
(74) *Attorney, Agent, or Firm* — Finnegan, Henderson, Farabow, Garrett & Dunner, LLP (57) ABSTRACT

A fuel cell includes: a membrane electrode assembly; a gas flow path member that has a first side that is arranged on a surface of the membrane electrode assembly; a pair of separators that are arranged sandwiching the membrane electrode assembly and the gas flow path member, and each have a separating portion and a plurality of holes separated by the separating portion, the holes being provided in each of opposite sides of the separator and being lined up in a predetermined direction along the sides; and a sealing plate that is arranged on an end portion of the first side adjacent to the holes, and is welded to the gas flow path member at a predetermined welding position, the predetermined welding position being provided in a region that includes a position on a straight line that passes through the separating portion and is perpendicular to the sides.

7 Claims, 10 Drawing Sheets

FUEL CELL

INCORPORATION BY REFERENCE

The disclosure of Japanese Patent Application No. 2014-194931 filed on Sep. 25, 2014 including the specification, drawings and abstract is incorporated herein by reference in its entirety.

BACKGROUND OF THE INVENTION

1. Field of the Invention

The invention relates to a fuel cell.

2. Description of Related Art

Japanese Patent Application Publication No. 2012-123949 (JP 2012-123949 A) describes a fuel cell that Includes expanded metal, a sealing plate provided on one surface side of the expanded metal, and a separator plate arranged on the oilier surface of the expanded metal (a gas flow path member).

The sealing plate is joined to the gas flow path member by welding. At the welding position, the gas flow path member melts and the flow path becomes blocked or narrow. As a result, a location where the gas does not flow easily is newly created at. the welding position and downstream thereof, and consequently, the power generation performance of the cell may decrease.

SUMMARY OF THE INVENTION

The invention may be realized in the form described below.

One aspect of the invention provides a fuel cell. This fuel cell includes a membrane electrode assembly; a gas flow path member that has a first side that is arranged on a surface of the membrane electrode assembly: a pair of separators that are arranged sandwiching the membrane electrode assembly and the gas flow path member, and that each have a separating portion and a plurality of holes separated by the separating portion, the holes being provided in each of opposite sides of the separator and being lined up in a predetermined direction along the sides; and a sealing plate that is arranged on an end portion of the first side adjacent to the holes, and is welded to the gas flow path member at a predetermined welding position, die predetermined welding position being provided in a region that includes a position on a straight line that passes through the separating portion, and the straight, line being perpendicular to the sides. The region that includes a position on a straight line that passes through the separating portion and is perpendicular to the sides is a region where gas and produced water do not flow easily due to the separating portion. That is, the welding position is provided in the region where gas and produced water do not flow easily, so a new region where gas and produced water do not flow easily will not be created. As a result, the supply of gas to the membrane electrode assembly and the discharge of produced water are maintained, so power generating performance is able to be inhibited from decreasing.

In the fuel cell of the aspect described above, the predetermined welding position may have a region that overlaps with the straight line that passes through the separating portion and may be perpendicular to the sides.

In the fuel cell of the aspect described above, the separating portion may be provided in a direction perpendicular to the opposite sides of the separator.

In the fuel cell of the aspect described above, the gas flow path member may be larger than a power generating region of the membrane electrode assembly in the predetermined direction, and the predetermined welding position may be closer to the holes than an end portion on the hole side of the power generating region is. With this structure, welding is performed at a position closer to the hole side than an end portion on a hole side of the power generating region, so even if a position where gas and produced water do not flow easily due to the weld is created, the effect on power generation is able to be inhibited.

In the fuel cell having the structure described above, the number of the predetermined welding position may range from one to six. With this specification, deformation and floating of the gas flow path member and the sealing plate are able to be suppressed, and welding costs are able to be reduced.

In the fuel cell having the structure described above, the number of the predetermined welding position may be three. When the number of welding positions is large, deformation and floating of the gas flow path member and the sealing plate are able to be better suppressed. On the other hand, when the number of welding positions is small, welding costs are able to be reduced. Having three welding positions makes it easy to balance welding costs with being able to suppress deformation and floating of the gas flow path member and the sealing plate.

The invention may be realized in a variety of forms. For example, the invention may be realized in the form of a joint structure of expanded metal and a sealing plate, or a manufacturing method of a fuel cell, in addition to the fuel cell.

BRIEF DESCRIPTION OF THE DRAWINGS

Features, advantages, and technical and industrial significance of exemplary embodiments of the invention will be described below with reference to the accompanying drawings, in which like numerals denote like elements, and wherein.

DETAILED DESCRIPTION OF EMBODIMENTS

Figure 1:
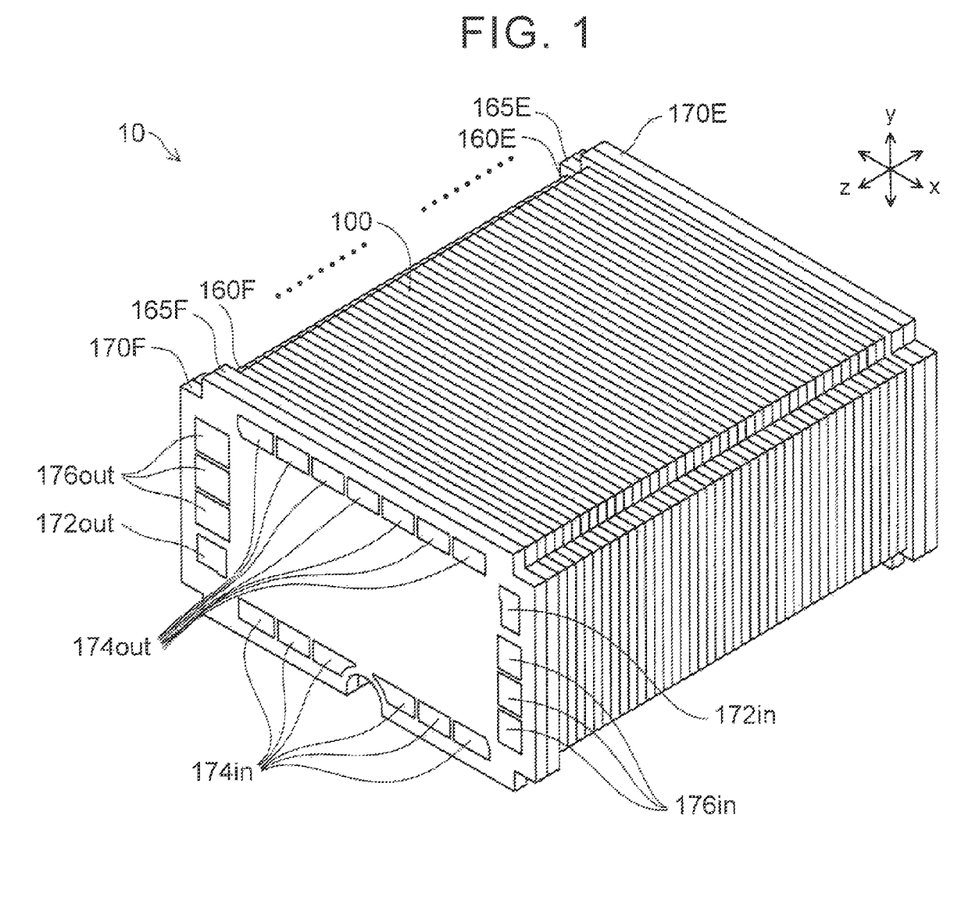
FIG. 1 is a perspective view schematically showing the structure of a fuel cell as one example embodiment of the invention.

FIG. 1 is a perspective view schematically showing the structure of a fuel cell 10 as one example embodiment of the invention. The fuel cell 10 has a stacked structure in which a plurality of unit cells 100 that are fuel cell cells are stacked together in a Z direction (hereinafter also referred to as the "stacking direction"), and sandwiched between a pair of end plates 170F and 170E, The fuel cell 10 has an insulating plate 165F and a terminal plate 160F, in order from the end plate 170F side, between the end plate 170F on the front end side and the unit cells 100. Similarly, the fuel cell. 10 also has an insulating plate 165E and a terminal plate 160E, in order from the end plate 170E side, between the end plate 170E on the rear end side and the unit cells 100. The unit cells 100, the terminal plates 160F and 160E, the insulating plates 165F and 165E, and the end plates 170F and 170E each have a plate structure that has a generally rectangular shape, and are arranged such that the long side of each extends in an X direction (horizontal direction), and the short side of each extends in a Y direction (vertical or perpendicular direction).

The end plate 170F, the insulating plate 165F, and the terminal plate 160F on the front end side each have a fuel gas supply hole 172in and a fuel gas discharge hole 172out, a plurality of oxidant gas supply holes 174in and oxidant gas discharge holes 174out, and a plurality of coolant supply holes 176in and coolant discharge holes 176out. These supply holes and discharge holes form corresponding gas or coolant supply manifolds and discharge manifolds by being connected to holes, not shown, that are provided in corresponding positions in each unit cell 100. On the other band, the end plate 170E, the insulating plate 165E, and the terminal plate 160E on the rear end side do not have these supply holes and discharge holes. This is because the fuel cell 10 in this example embodiment is a type of fuel cell that supplies reaction gas (i.e., fuel gas and oxidant gas) and coolant from the end plate 170F on the front end side to each of the unit cells 100 via the supply manifold, and discharges off-gas and waste water from the unit cells 100 out of the fuel cell 10 from the end plate 170F on the front end side via the discharge manifold. However, the type of fuel cell is not limited to this. That is, the fuel cell according to this example embodiment of the invention may be any of a variety of types such as a type in which a reaction gas and coolant, are supplied from the end plate 170F on die front end side, and off-gas and waste water are discharged out of the fuel cell 10 from the end plate 170E on the rear end side, for example.

The plurality of oxidant, gas supply holes 174in are arranged in the X direction (the long side direction) in an outer edge portion of a lower end of the end plate 170F on the front end side, and the plurality of oxidant gas discharge holes 174out are arranged in the X direction in an outer edge portion of an upper end. The fuel gas supply hole 172in is arranged in an upper end portion in the Y direction (the short side direction) of an outer edge portion on the right end of the end plate 170F on the front end side, and the fuel gas discharge hole 172out is arranged in a lower end portion in the Y direction of an outer edge portion on the left end. The plurality of coolant supply holes 176in are arranged in the Y direction below the fuel gas supply hole 172in, and the plurality of coolant discharge holes 176out are arranged in the Y direction above the fuel gas discharge hole 172out.

The terminal plate 160F on the front end side and the terminal plate 160E on the rear end side are collector plates for power generated by the unit cells 100, and output the power collected from terminals, not shown, to an external device.

Figure 2:
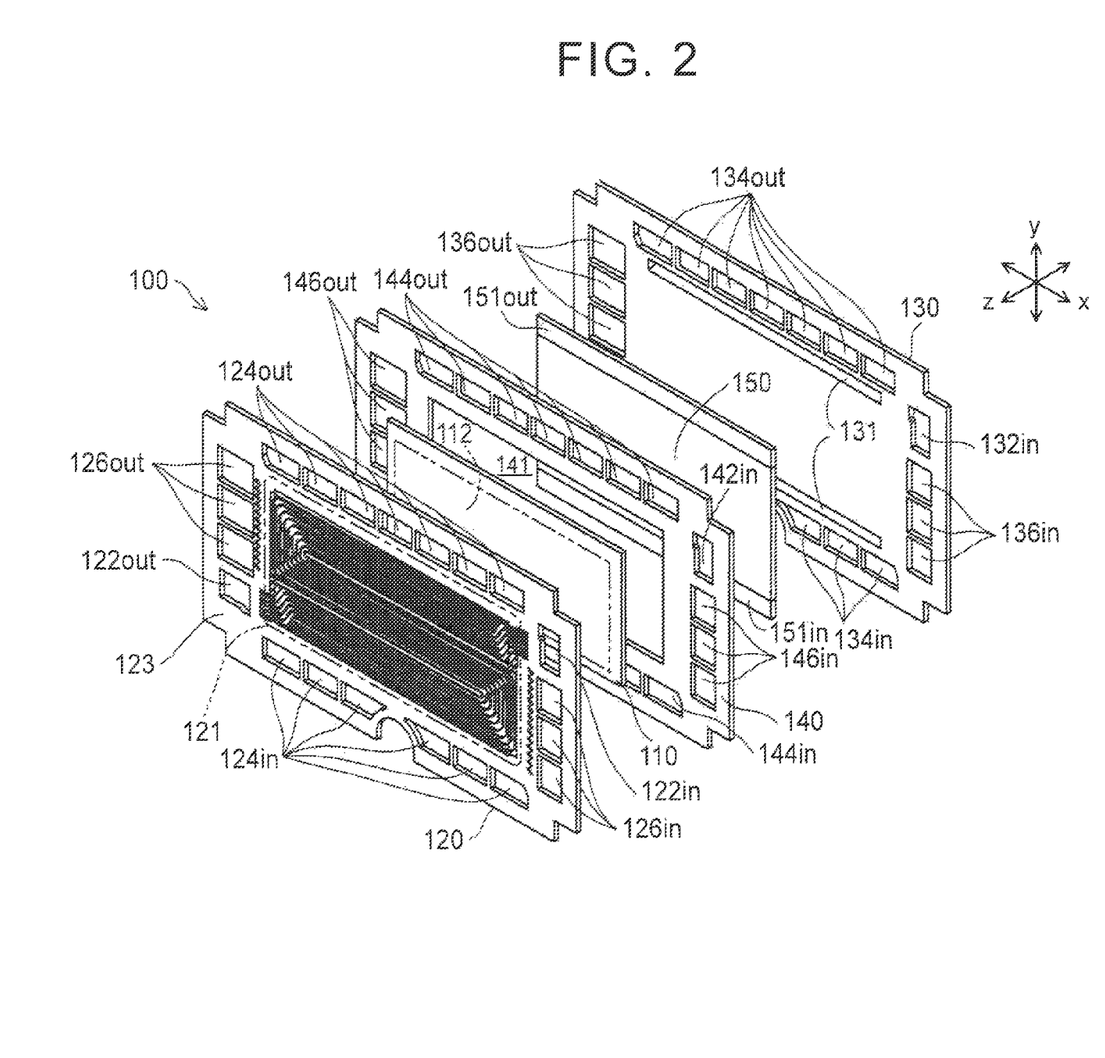
FIG. 2 is an exploded perspective view schematically showing the structure of a unit cell.

FIG. 2 is an exploded perspective view schematically showing the structure of the unit cells 100 (only one unit cell 100 is shown here). The unit cell 100 includes a Membrane Electrode & Gas Diffusion Layer Assembly (MEGA) 110, and an anode-side separator 120, a cathode-side separator 130, a seal member 140, and a gas flow path member 150 that are arranged sandwiching the MEGA 110 from both sides.

The MEGA 110 is a power generating body that includes a Membrane Electrode Assembly (MEA) in which a pair of catalyst electrode layers are formed one on each side of an electrolyte membrane, and is formed by sandwiching this MEA between Gas Diffusion Layers (GDLs) that facilitate gas diffusion and transmission, MEGA may also be referred to as "MEA".

The anode-side separator 120 and the cathode-side separator 130 are members that have gas blocking and electron conducting properties. For example, the anode-side separator 120 and the cathode-side separator 130 are formed by a carbon member of dense carbon in which carbon particles have been compressed to a degree in which the carbon is gas-impermeable or the like, or a metal member of stainless steel or titanium or the like. In this example embodiment, the anode-side separator 120 and the cathode-side separator 130 are made by press forming stainless steel.

The anode-side separator 120 has a fuel gas flow path 121 in the form of a plurality of groove-like lines on the surface on the side near the MEGA 110, and a coolant flow path in the form of a plurality of groove-like lines on the surface on the opposite side. The fuel gas flow path 121 and the coolant flow path alternate on the front and back of the separator. The anode-side separator 120 includes, as supply holes and discharge holes that form the manifolds described above, a fuel gas supply hole 122in and a fuel gas discharge hole 122out, a plurality of oxidant gas supply holes 124in and oxidant gas discharge holes 124out. and a plurality of coolant supply holes 126in and coolant discharge holes 126out. Similarly, the cathode-side separator 130 includes a fuel gas supply hole 132in and a fuel gas discharge hole, a plurality of oxidant gas supply holes 134in and oxidant gas discharge holes 134out, and a plurality of coolant supply holes 136in and coolant discharge holes 136out. Also, the seal member 140 similarly includes a fuel gas supply hole 142in and a fuel gas discharge hole, a plurality of oxidant gas supply holes 144in and oxidant gas discharge holes 144out, and a plurality of coolant supply holes 146in and coolant discharge holes 146out, corresponding to the supply holes and discharge holes in the anode-side separator 120. In the schematic perspective view shown in FIG. 2, the fuel gas discharge hole in the cathode-side separator 130 and the fuel gas discharge hole in the seal member 140 are hidden by other members.

The seal member 140 is made of resin or rubber or the like that has sealing characteristics and insulating properties. The seal member 140 has a power generating region window 141 in the center that matches the rectangular shape of the MEGA 110. A peripheral edge of this power generating region window 141 has a stepped shape, and the MEGA 110 fits onto this stepped portion. In this way, the MEGA 110 that is fitted in the power generating region window 141 overlaps with the seal member 140 at the stepped portion of the seal member 340, and the region exposed in power generating region window 141 is a power generating region 112 that receives a supply of fuel gas from the anode-side separator 120 that will be described later. The seal member 140 has the supply holes and the discharge holes described above provided in a region around the power generating region window 141 into which the MEGA 110 is inserted. With the MEGA 110 inserted into the power generating region window 141, the seal member 140 seals the anode-side separator 120 and the cathode-side separator 130, including around die supply holes and discharge holes. That is, the seal member 140 seals the MEGA 110 at the stepped portion all along the outside region of the power generating region 112, and seals between the anode-side separator 120 and the cathode-side separator 130 at the rectangular outer peripheral surface of the MEGA 110. The anode-side separator 120 and the cathode-side separator 130 include a fuel gas seal 300, an oxidant gas seal 301, and a coolant seal 302, as shown in FIG. 3 that will be described later, in order to ensure the sealability of the supply holes and discharge holes for the fuel gas, the oxidant gas, and the coolant when the unit cells 100 are stacked, at the joining surfaces of adjacent separators.

The gas flow path member 150 and the seal member 140 are positions in order from the cathode-side separator 130, between the MEGA 110 and the cathode-side separator 130. The gas flow path member 150 forms a gas flow path for channeling oxidant gas that is supplied from the oxidant gas supply holes 134in in the cathode-side separator 130, in the surface direction (the XY plane direction) of the MEGA 110, and then discharging this oxidant gas from the oxidant gas discharge holes 134out. A porous member that has conductivity and gas diffusivity such as a metal porous body (e.g., expandable metal) may be used as the gas flow path member 150. Also, this gas flow path member 150 has thin sheet-like gas-impermeable sealing plates 151out and 151in on both an upper end and a lower end in FIG. 2, and these sealing plates 151out and 151in are joined to regions on the upper and lower ends of the MEGA 110.

The cathode-side separator 130 has a generally flat plate-shape including the regions where the supply holes and the discharge holes described above are formed. In addition, the cathode-side separator 130 has legs 131 near the upper and lower ends of the gas flow path member 150 in FIG. 2. The legs 131 protrude toward the back side of the paper on which FIG. 2 is drawn. These legs 131 contact an outer edge portion 123 of the anode-side separator 120 of an adjacent unit cell 100 when the unit cells 100 are stacked together.

Figure 3:
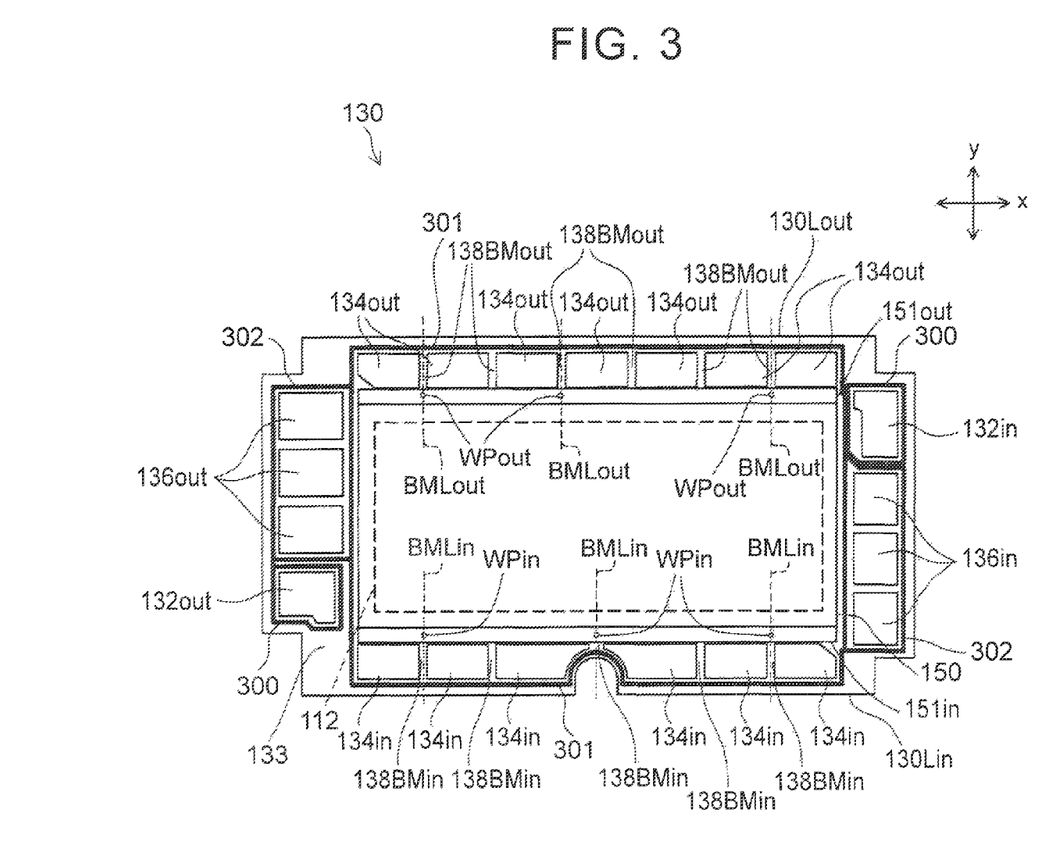
FIG. 3 is a plan view of a cathode-side separator, a gas flow path member, and a sealing plate.

FIG. 3 is a plan view of the cathode-side separator 130, the gas flow path member 150, and the sealing plates 151in and 151out. FIG. 3 is a view shown from the MEGA 110 side. The cathode-side separator 130 is formed by press forming stainless steel or the like, and is arranged such that the gas flow path member 150, the seal member 140, and the MEGA 110 are sandwiched in order from the cathode-side separator 130 side between the cathode-side separator 130 and the anode-side separator 120, as shown in FIG 2.

The cathode-side separator 130 has, as supply holes and discharge holes for reaction gas and coolant described above that are provided in an outer edge portion 133, a fuel gas supply hole 132in and a fuel gas discharge hole 132out, a plurality of oxidant gas supply holes 134in that are separated by separating portions 138BMin, a plurality of oxidant gas discharge holes 134out that are separated by separating portions 138BMout, and a plurality of coolant supply holes 136in and coolant discharge holes 136out. The plurality of oxidant gas supply holes 134in are formed along a side 130Lin, and the plurality of oxidant gas discharge holes 134out are formed along a side 130Lout. The side 130Lin and the side 130Lout are opposite sides. Of these supply holes and discharge holes, the fuel gas supply hole 132in and the fuel gas discharge hole 132out are individually sealed by the fuel gas seal 300, and the rows of the plurality of oxidant gas supply holes 134in and the plurality of oxidant gas discharge holes 134out are sealed by the oxidant gas seal 301. Similarly, the rows of the plurality of coolant supply holes 136in and the coolant discharge holes 136out are sealed by the coolant seal 302. On the near side of the cathode-side separator 130 in the drawing, the oxidant gas seal 301 is not provided on the center side of the plurality of oxidant gas supply holes 134in and the center side of the plurality of oxidant gas discharge holes 134out, in order to allow the oxidant gas to flow.

In FIG. 3, the gas flow path member 150 is arranged in the center portion on the near of the cathode-side separator 130 in the drawing. The sealing plates 151in and 151out are arranged on the oxidant gas supply holes 134in side end portion of the gas flow path member 150 and the oxidant gas discharge holes 134out side end portion of the gas flow path member 150, respectively. The gas flow path, member 150 and the sealing plates 151in and 151out are spot welded at predetermined welding positions WPin and WPout. The welding positions WPin are positions on straight lines BMLin that pass through the separating portions 138BMin and are perpendicular to the side 130Lin where the oxidant gas supply holes 134in are lined up. The welding positions WPout are positions on straight lines BMLout that pass through the separating portions 138BMout and are perpendicular to the side 130Lout where the oxidant gas discharge holes 134out are lined up. The welding positions WPin are positions that are closer to the oxidant gas supply hole 134in side than they are to the end portion of the power generating region 112 of the MEGA 110, and the welding positions WPout are positions that are closer to the oxidant gas discharge holes 134out side than they are to the end portion of the power generating region 112 of the MEGA 110. In FIG. 3, the position corresponding to the position of the power generating region 112 is indicated by a broken line. Because there is a possibility that the gas flow path member 150 may be blocked, making it difficult, for gas to flow through at the positions of the welding positions WPin and WPout, the welding positions WPin and WPout preferably do not overlap with the power generating region 112.

Figure 4:
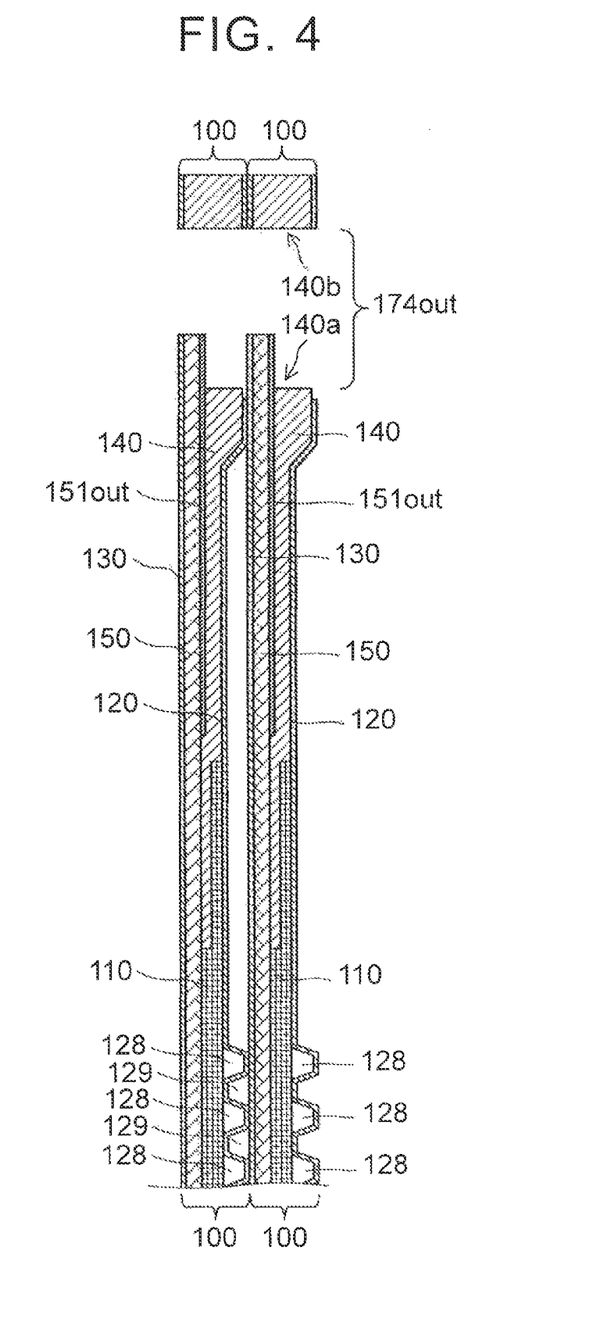
FIG. 4 is a sectional view showing a frame format of an area near an oxidant gas discharge hole of the unit cell.

FIG. 4 is a sectional view showing a frame format of the area near the oxidant gas discharge holes 174out in the unit cells 100. Each of the unit cells 100 includes the MEGA 110, the seal member 140, the cathode-side separator 130, the anode-side separator 120, the gas flow path member 150, and the sealing plate 151out. The area near the oxidant gas supply holes 174in has the same structure except for that it is vertically inverted, so drawings and a description thereof will he omitted.

The sealing plate 151out is arranged on the cathode side of the seal member 140. The sealing plate 151out is a metal plate of which a portion protrudes into the oxidant gas discharge holes 174out. In this example embodiment, the lengths of the cathode-side separator 130, the anode-side separator 120, and the seal member 140 are all different, so the end portion on the MEGA side of the oxidant gas discharge holes 174out will be defined as an end surface 140a of the seal member 140. Taking into account factors such as burrs and manufacturing variation of the seal member 140, the position of the end portion on the MEGA side of the oxidant gas discharge holes 174out may also be regarded as being defined by the average position of the end surface 140a of the seal member 140. The other end of the oxidant gas discharge holes 174out may also be regarded as being defined by an end surface 140b on the opposite side of the seal member 140, or either the end portion of the cathode-side separator 130 or the end portion of the anode-side separator 120. This is because the positions of the end surface 140b on the opposite side of the seal member 140, and the end portions of the anode-side separator 120 or the cathode-side separator 130 are the same in the vertical direction of the drawing. The gas flow path member 150 is arranged on the cathode side of the MEGA 110, the seal member 140, and the sealing plate 151out. The gas flow path member 150 is a flow path for channeling the oxidant gas, and is formed by expanded metal as described above. However, the gas flow path member 150 may also be formed by another type of metal porous body instead of expanded metal. The gas flow path member 150 protrudes inside the oxidant gas discharge holes 174out to the same position as the sealing plate 151out, The amounts that the cathode-side separator 130, the gas flow path member 150, and the sealing plate 151out protrude are shown in frame format in FIG. 4.

The cathode-side separator 130 is arranged on the adjacent unit cell 100 side of the gas flow path member 150, The cathode-side separator 130 is a metal plate of which a portion protrudes into the oxidant gas discharge holes 174out. The anode-side separator 120 is arranged on a surface of the seal member 140 that is on the opposite side from the gas flow path member 150. The anode-side separator 120 is a patterned indented metal plate. The anode-side separator 120 does not protrude into the oxidant gas discharge holes 174out. A fuel gas flow path 128 is formed between the anode-side separator 120 and the MEGA 110, and a coolant flow path 129 is formed between the anode-side separator 120 and the cathode-side separator 130.

Figure 5:
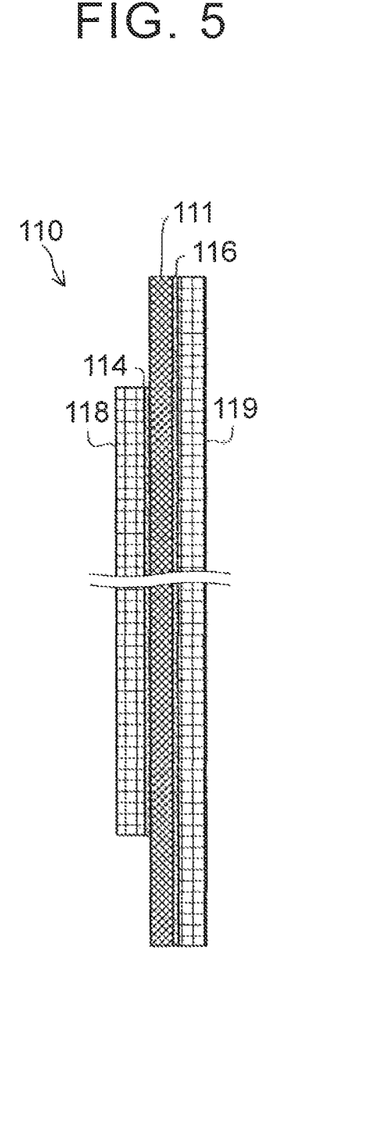
FIG. 5 is an explanatory view of the structure of a membrane electrode and gas diffusion layer assembly.

FIG. 5 is an explanatory view showing the structure of the MEGA 110. The MEGA 110 includes an electrolyte membrane 111, a cathode-side catalyst layer 114, an anode-side catalyst layer 116, a cathode-side gas diffusion layer 118, and an anode-side gas diffusion layer 119, The electrolyte membrane 111 is an electrolyte membrane that has proton conductivity, and is made of fluorine electrolyte resin (ion-exchange resin) such as a perfluorocarbon sulfonic acid polymer, for example.

The cathode-side catalyst layer 114 and the anode-side catalyst layer 116 have carbon that carries a catalyst (e.g., platinum). In this example embodiment, the anode-side catalyst layer 116 is applied to the entire region of a first surface of the electrolyte membrane 111, but the cathode-side catalyst layer 114 is applied only to a partial region (i.e., a power generating region) of a second surface of the electrolyte membrane 111. The reason for this is that the amount of catalyst per unit area is able to be smaller (typically equal to or less than ½) with the anode-side catalyst layer 116 than it is with the cathode-side catalyst layer 114, so even if the catalyst is applied to the entire region of the first surface of the electrolyte membrane 111, it will not be excessively wasteful, while the application process will be easier.

The cathode-side gas diffusion layer 118 is arranged on the cathode-side catalyst layer 314, and the anode-side gas diffusion layer 119 is arranged on the anode-side catalyst layer 116. The cathode-side gas diffusion layer 118 and the anode-side gas diffusion layer 119 are made of carbon paper in this example embodiment, but they may also be made of carbon nonwoven fabric instead of carbon paper.

Figure 6:
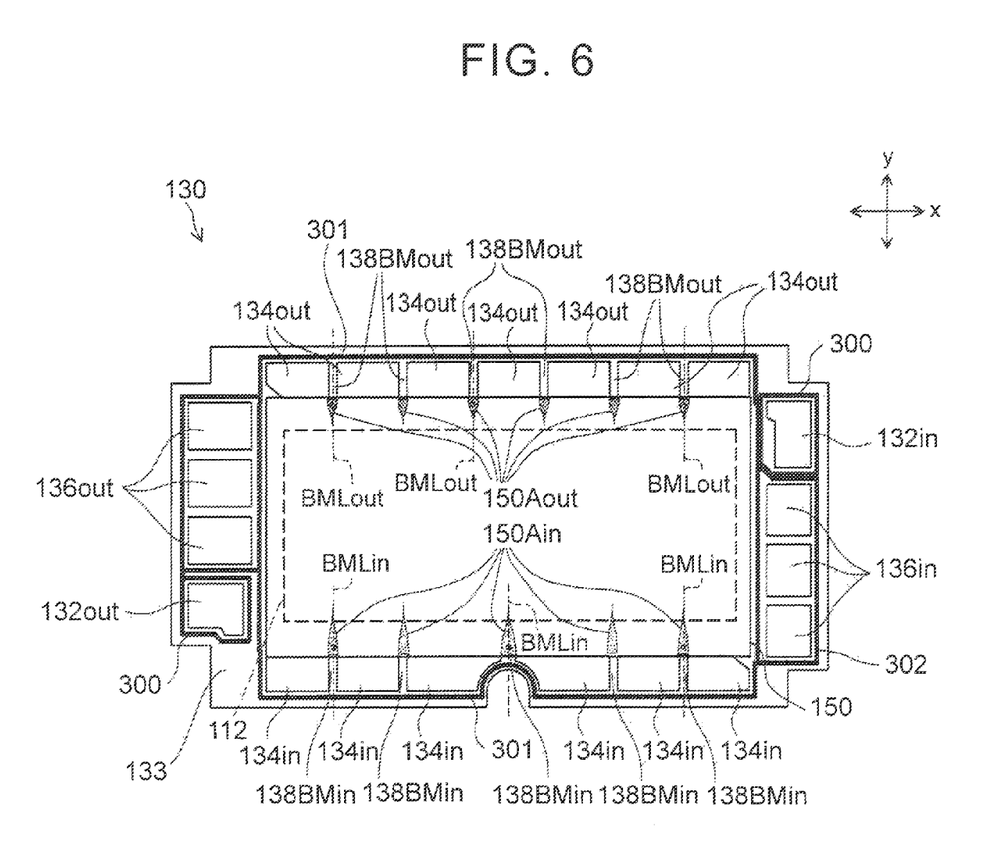
FIG. 6 is an explanatory view illustrating a reason for providing a welding position on a straight line that passes through a separating portion.

FIG. 6 is an explanatory view illustrating the reason for providing the welding positions WPin and WPout on the straight lines BMLin and BMLout that pass through the separating portions 138BMin and 138BMout. The oxidant gas Is supplied from the oxidant gas supply holes 134in to the gas flow path member 150, and supplied to the power generating region 112 as it passes through the gas flow path member 150. Oxidant off-gas is then discharged from the oxidant gas discharge holes 134out. Here, the oxidant gas supply holes 134in are separated by the separating portions 138BMin. The separating portions 138BMin interfere with the flow of gas, so the gas originally has difficulty flowing through a region 150Ain downstream of the separating portions 138BMin. Therefore, even if the welding positions WPin are provided in this region 15Ain, a new region where gas has difficulty flowing will not be created. That is, the difficulty with which the gas flows will be almost unchanged by the presence or absence of the welding positions WPin. With the discharge side as well, the gas and produced water originally have difficulty flowing through a region 150Aout upstream of the separating portions 138BMout. Therefore, even if the welding positions WPout are provided in this region 150Aout, the difficulty with which the gas and produced water flow will be almost unchanged.

Figure 7:
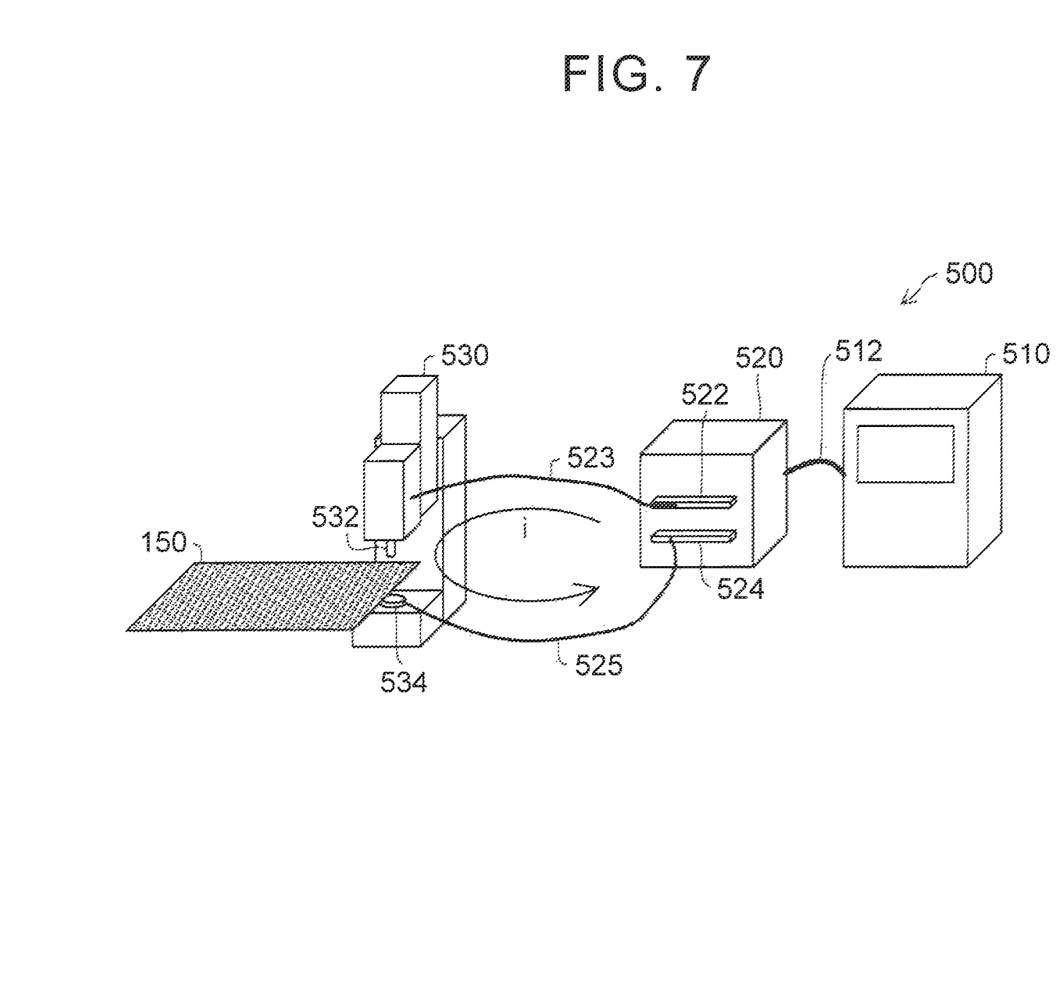
FIG. 7 Is an explanatory view of a spot welding apparatus.

FIG. 7 is an explanatory view of a spot welding apparatus. The spot welding apparatus 500 is provided with a power supply 510, a transformer 520, and a weld gun 530. The power supply 510 generates the necessary current for welding. The transformer 520 is connected to the power supply 510 by a power line 512, and steps up the voltage of the power generated by the power supply 510 and supplies the resultant power to the weld gun 530. The weld gun 530 includes an upper electrode 532 and a lower electrode 534. The upper electrode 532 is connected to a positive electrode 522 of the transformer 520 by an electric wire 523, and the lower electrode 534 is connected to a negative electrode 524 of the transformer 520 by an electric wire 525. The spot welding apparatus 500 pinches welding objects (i.e., the gas flow path member 150 and the sealing plates 151) while applying pressure between the upper electrode 532 and the lower electrode 534, and welds the welding objects together by flowing current through them and melting them.

Figure 8:
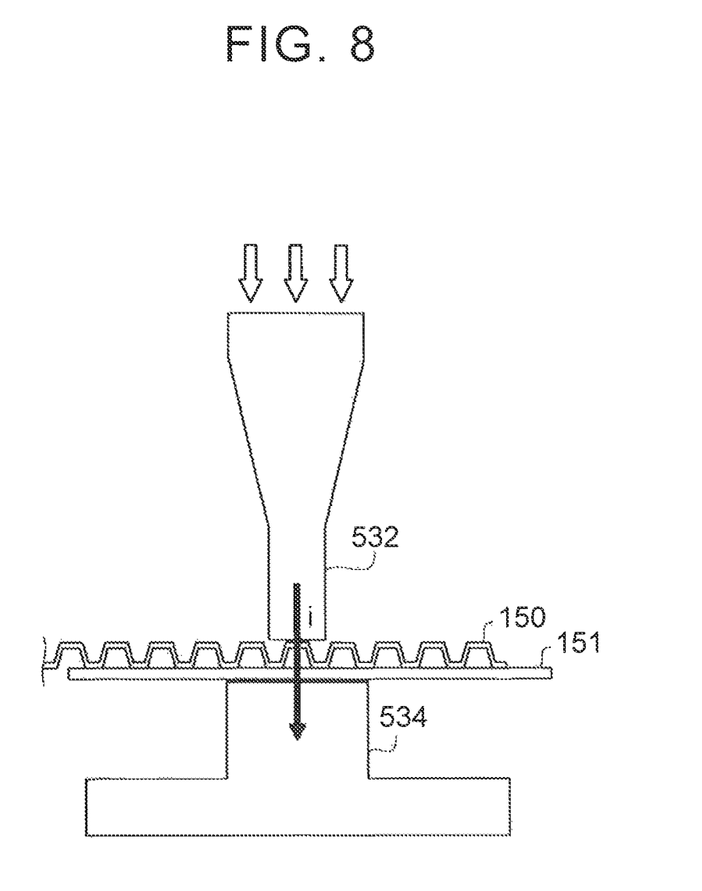
FIG. 8 is an enlarged explanatory view of a welding portion of a weld gun.

FIG. 8 is an enlarged explanatory view of a welding portion of the weld gun. The diameter of the upper electrode 532 is approximately 1.5 mm, and the diameter of the lower electrode 534 is approximately 3.0 mm. Welding is performed while pinching the gas flow path member 150 and the sealing plates between the upper electrode 532 and the lower electrode 534 and applying pressure of approximately 50±3 N. A typical welding current is 920±30 A, the typical energizing time is 35±3 ms. and the typical slope time is 1.8 ms. The pressure, welding current, energizing time, and slope time may be changed to appropriate values depending on the material and thickness of the sealing plates 151 and the gas flow path member 150.

Figure 9A:
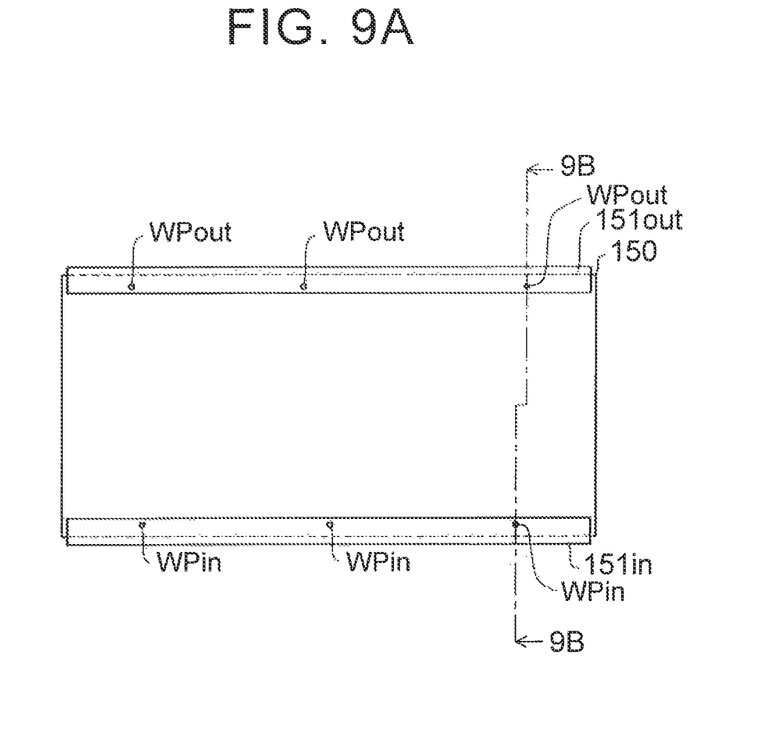
FIG. 9A is a plan view of the gas flow path member to which the sealing plate has been welded.
Figure 9B:
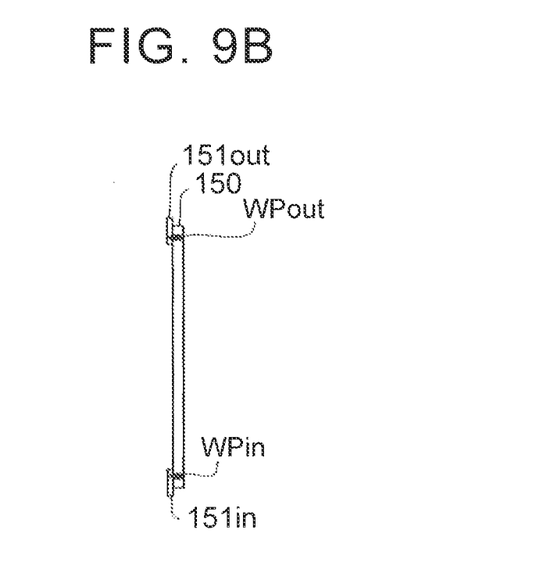
FIG. 9B is a sectional view of the gas flow path member to which the sealing plate has been welded.

FIG. 9 is a plan view and a sectional view of the gas flow path member 150 to which the sealing plates 151out and 151in have been welded. FIG. 9A is a plan view, and FIG. 9B is a sectional view of FIG. 9A cut along line 9B-9B. In this example embodiment, the gas flow path member 150 is connected to the sealing plate 151in at three welding positions WPin on the upstream side. The gas flow path member 150 is also welded to the sealing plate 150out at three welding positions WPout on the downstream side as well. The number of welding positions may be any number from one to six, such as three, for each of the sealing plates 151in and 151out and the gas flow path member 150. With three welding positions, deformation and floating of the gas flow path member 150 and the sealing plates 151in and 151out can be suppressed, and welding costs can be reduced. If the number of welding positions is less than three, the welding costs can be reduced. If the number of welding positions is greater than three, deformation and floating of the gas flow path member 150 and the sealing plates 151in and 151out can be suppressed. If the number of welding positions is three or more, the welding positions may be provided such that the intervals therebetween are substantially equal. The gas flow path member 150 to which the sealing plates 151in and 151out have been welded is overlapped with the MEGA 110, the anode-side separator 120, the cathode-side separator 130, and the seal member 140, as shown in FIG. 2, thereby forming the unit cell 100.

According to the example embodiment described above, the gas flow path member 150 and the sealing plate 151in are welded at the welding positions WPin on the straight lines BMLin that pass through the separating portions 138BMin and are perpendicular to the side 130Lin of the cathode-side separator 130. The gas flow path member 150 and the sealing plate 151out are welded at the welding positions WPout on the straight lines BMLout that pass through the separating portions 138BMout and are perpendicular to the side 130Lout of the cathode-side separator 130. The welding positions WPin and WPout are in the regions 150Ain and 150Aout where gas and produced water originally have difficulty flowing due to the separating portions 138BMin and 138BMout. Therefore, even if welding positions WPin and WPout are newly provided, positions and regions where gas and produced water have difficulty flowing will not he newly created. Therefore, a decrease in power generating performance is able to be inhibited.

In this example embodiment, the gas flow path member 150 and the sealing plates 115in and 151out are spot welded. The gas flow path member 150 and the sealing plates 151in and 151out may also be joined using crimping, bonding by an adhesive, brazing, laser welding, or fusion welding or the like, instead of spot welding.

In this example embodiment, the welding positions WPin and WPout are provided on the straight lines BMLin that pass through the separating portions 138BMin and the straight lines BMLout that pass through the separating portions 138BMout, However, the welding positions WPin and WPout do not necessarily have to be on the straight lines BMLin and BMLout, as long as they are in the region where the gas and produced water have difficulty flowing due to the separating portions 138BMin and 138BMout. For example, the welding positions WPin and WPout may also be provided in a region that includes the straight lines BMLin and BMLout.

A modified example of the example embodiment of the invention will now be described. In the example embodiment described above, the gas flow path member 150 and the sealing plate 151in are welded at the welding positions WPin on the straight lines BMLin that pass through the separating portions 138BMin and are perpendicular to the side 130Lin of the cathode-side separator 130. The gas flow path member 150 and the sealing plate 151out are welded at the welding positions WPout on the straight lines BMLout that pass through the separating portions 138BMout and are perpendicular to the side 130Lout of the cathode-side separator 130. The positions on the straight lines BMLin that pass through the separating portions 138BMin and are perpendicular to the side 130Lin of the cathode-side separator 130, or the positions on the straight lines BMLout that pass through the separating portions 138BMout and are perpendicular to the side 130Lout of the cathode-side separator 130 may also be used for another purpose.

Figures 10A, 10B:
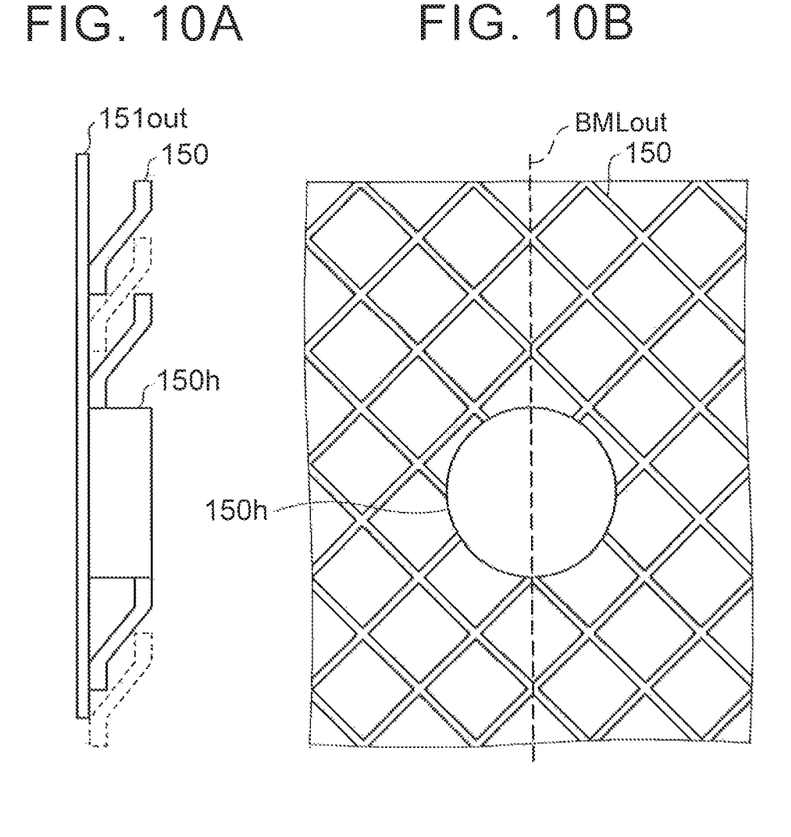
FIG. 10A is an enlarged sectional view of a portion where the gas flow path member and the sealing plate in FIG. 9B overlap.
FIG. 10B is an enlarged plan view of the portion where the gas flow path member and the sealing plate in FIG. 9A overlap.

FIG. 10 is an enlarged sectional view and an enlarged plan view of a portion where the gas flow path member and the sealing plate In FIG. 9 overlap. The sectional view shown in FIG. 10A is a view of the gas flow path member 150 and the sealing plate 151out, and the plan view shown in FIG. 10B is a view of only the gas flow path member 150. A circular or oblong suspending hole 150b is formed in the gas flow path member 150. The position of the suspending hole 150h is a position on a straight line BMLout that passes through a separating portion 138BMout and is perpendicular to the side 130Lout of the cathode-side separator 130. The suspending hole 150h is used when PAC treating the gas flow path member 150. PAC treatment is a surface treatment that is performed to improve corrosion resistance, and is a treatment whereby a carbon film is formed on the surface of the gas flow path member 150 using CVD equipment, for example. In PAC treatment, a hooking bar is inserted into the suspending hole 150h in the gas flow path member 150, and the gas flow path member is suspended inside of a chamber of the CVD equipment. The suspending hole 150h may disturb the flow of gas and produced water that flows through the gas flow path member 150. Therefore, the suspending hole 150h is preferably provided in a position on the straight line BMLout that passes through the separating portion 138BMout and is perpendicular to the side 130Lout of the cathode-side separator 130, which is in a region where the gas and produced water originally has difficulty flowing. The suspending hole 150h may also be used to position the cathode-side separator 130 and the gas flow path member 150 with respect to each other.

While the invention has been described with reference to various example embodiments thereof, these example embodiments are intended to facilitate understanding of the invention and in no way limit the invention. The invention may be modified or improved without departing from the spirit and scope thereof, and naturally includes all equivalents thereof.

What is claimed is:

1. A fuel cell comprising:
   a membrane electrode assembly;
   a gas flow path member that has a first side that is arranged on a surface of the membrane electrode assembly;
   a pair of separators that are arranged sandwiching the membrane electrode assembly and the gas flow path member, each of the pair of separators having:
      a plurality of holes provided in each of opposing sides of the corresponding separator and being lined up in a predetermined direction along each of the opposing sides, and
      at least one separating portion provided on each of the opposing sides so as to separate the plurality of holes, the at least one separation portion defining a region that extends generally along a straight line that is perpendicular to the opposing sides; and
   a sealing plate that is arranged on an end portion of the first side of the gas flow path member adjacent to the plurality of holes, and is welded to the gas flow path member at a predetermined welding position, the predetermined welding position being provided in the region defined by the at least one separating portion.

2. The fuel cell according to claim 1, wherein
   the gas flow path member is larger than a power generating region of the membrane electrode assembly in the predetermined direction, and the predetermined welding position is closer to the plurality of holes than an end portion on a hole side of the power generating region is.

3. The fuel cell according to claim 1, wherein the number of the predetermined welding position ranges from one to six.

4. The fuel cell according to claim 3, wherein the number of the predetermined welding position is three.

5. The fuel cell according to claim 1, wherein:
the at least one separating portion includes a plurality of separating portions provided at intervals on each of the opposing sides so as to separate the plurality of holes,
each of the plurality of separating portions defining a region that extends generally along a straight line that is perpendicular to the opposing sides, and
the predetermined welding position includes a plurality of predetermined welding positions provided in the regions defined by the plurality of separating portions.

6. The fuel cell according to claim 1, wherein the gas flow path member and each of the pair separators are separate components.

7. The fuel cell according to claim 1, wherein the gas flow path member forms a gas flow path for channeling gas that is supplied from the holes provided in one of the opposing sides and discharging the gas from the holes provided in the other of the opposing sides.

* * * * *